United States Patent
van Nieuwstadt

(10) Patent No.: US 7,121,085 B2
(45) Date of Patent: Oct. 17, 2006

(54) METHOD AND APPARATUS FOR CONTROLLING HYDROCARBON INJECTION INTO ENGINE EXHAUST TO REDUCE NOX

(75) Inventor: Michiel Jacques van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,443

(22) Filed: Sep. 4, 2001

(65) Prior Publication Data

US 2003/0041594 A1   Mar. 6, 2003

(51) Int. Cl.
*F01N 3/00*   (2006.01)

(52) U.S. Cl. .......................... 60/286; 60/274; 60/276; 60/277; 60/284; 60/303

(58) Field of Classification Search ................ 60/274, 60/276, 277, 286, 295, 301, 303, 284; 422/172, 422/182, 183; 73/119 A
See application file for complete search history.

(56) References Cited

U.S. PATENT DOCUMENTS

| | | | |
|---|---|---|---|
| 5,201,802 A * | 4/1993 | Hirota et al. ................ 60/277 |
| 5,369,956 A | 12/1994 | Daudel et al. |
| 5,410,873 A | 5/1995 | Tashiro |
| 5,419,122 A | 5/1995 | Tabe et al. |
| 5,428,956 A * | 7/1995 | Maus et al. ................ 60/277 |
| 5,479,775 A * | 1/1996 | Kraemer et al. ............. 60/274 |
| 5,497,617 A * | 3/1996 | Bagley et al. ............... 60/274 |
| 5,540,047 A | 7/1996 | Dahlheim et al. |
| 5,628,186 A | 5/1997 | Schmelz |
| 5,643,536 A | 7/1997 | Schmelz |
| 5,675,967 A * | 10/1997 | Ries-Mueller ............... 60/274 |
| 5,701,735 A * | 12/1997 | Kawaguchi ................. 60/286 |
| 5,706,652 A * | 1/1998 | Sultan ....................... 60/274 |
| 5,751,602 A * | 5/1998 | Maus et al. ................ 60/286 |
| 5,787,705 A * | 8/1998 | Thoreson .................... 60/274 |
| 5,806,310 A * | 9/1998 | Daidou et al. .............. 60/286 |
| 5,831,145 A | 11/1998 | Logothetis et al. |
| 5,842,341 A | 12/1998 | Kibe |
| 5,845,487 A | 12/1998 | Fraenkle et al. |
| 5,896,743 A * | 4/1999 | Griffin ....................... 60/274 |
| 5,941,067 A | 8/1999 | Hirota et al. |
| 5,950,422 A | 9/1999 | Dolling |
| 6,001,318 A | 12/1999 | Tillaart et al. |
| 6,016,653 A | 1/2000 | Glassey et al. |

(Continued)

FOREIGN PATENT DOCUMENTS

EP   0822323 A1   2/1996

(Continued)

*Primary Examiner*—Tu M. Nguyen
(74) *Attorney, Agent, or Firm*—Allan J. Lippa; Allen Hall McCoy Russell & Tuttle LLP

(57) ABSTRACT

A method and system for controlling hydrocarbon injection into engine exhaust to reduce NOx. The method and system inject the hydrocarbon into the engine exhaust in accordance with detection of a light-off event. The light-off event can be detected because when there is this hydrocarbon-O2 reaction, such reaction is an exothermic reaction and thus heat is generated and given off. The generation of such heat may be detected by measuring the difference in temperature across the catalyst. The peak in NOx conversion efficiency temperature changes with age. However, because the peak in NOx conversion efficiency temperature occurs at substantially the same light-off temperature, a determination of light-off by the system and method enables adjustment in the hydrocarbon injection level for maximum NOx reduction efficiency.

8 Claims, 3 Drawing Sheets

U.S. PATENT DOCUMENTS

| | | |
|---|---|---|
| 6,017,503 A | 1/2000 | Kato et al. |
| 6,079,203 A | 6/2000 | Wakamoto |
| 6,119,448 A | 9/2000 | Emmerling et al. |
| 6,134,883 A | 10/2000 | Kato et al. |
| 6,164,065 A | 12/2000 | Denari et al. |
| 6,167,698 B1 * | 1/2001 | King et al. .................. 60/286 |
| 6,182,443 B1 * | 2/2001 | Jarvis et al. ................. 60/274 |
| 6,209,313 B1 * | 4/2001 | Wissler et al. ............... 60/286 |
| 6,311,484 B1 * | 11/2001 | Roth et al. .................... 60/286 |
| 6,357,226 B1 * | 3/2002 | Borland ........................ 60/286 |
| 6,401,453 B1 * | 6/2002 | Lemire ......................... 60/274 |
| 6,450,018 B1 * | 9/2002 | Mobius ......................... 60/277 |
| 6,487,852 B1 * | 12/2002 | Murphy et al. ............... 60/286 |
| 6,523,341 B1 * | 2/2003 | Rumpsa et al. ............... 60/277 |
| 6,568,178 B1 * | 5/2003 | Hirota et al. .................. 60/297 |
| 6,594,990 B1 * | 7/2003 | Kuenstler et al. ............. 60/295 |
| 6,651,422 B1 * | 11/2003 | LeGare ......................... 60/277 |

FOREIGN PATENT DOCUMENTS

| | | |
|---|---|---|
| EP | 1027919 A2 | 8/2000 |
| JP | 10212932 | 8/1998 |

* cited by examiner

METHOD AND APPARATUS FOR CONTROLLING HYDROCARBON INJECTION INTO ENGINE EXHAUST TO REDUCE NOX

BACKGROUND OF INVENTION

This invention relates to methods and apparatus for reducing NOx in engine exhaust and more particularly to method and apparatus for reducing NOx in engine exhaust using hydrocarbon to react with such engine exhaust.

As is known in the art, lean burn engines (e.g., diesel and DISI engines) provide great fuel efficiency compared to stoichiometric spark ignited engines at the expense of more complicated exhaust after-treatment. More particularly, one such after-treatment is the reduction of engine exhaust NOx. Lean NOx catalysts (ALNCs) are typically utilized to reduce tail pipe NOx emissions.

In a typical ALNC configuration, a reductant or reactant, e.g., urea or hydrocarbon, is introduced into the engine exhaust stream. In the case of a hydrocarbon (HC), the hydrocarbon is to react with the NOx in the engine exhaust stream and the reaction is facilitated in the catalyst. This NOx reduction arrangement is essentially an open-loop arrangement because a measurement of the effectiveness of the NOx reduction is not used to adjust the amount of reactant being introduced, or injected into the engine exhaust. This open-loop arrangement includes a look-up table which stores the relationship between the desired amount of hydrocarbon injection in accordance with engine speed, engine load, EGR level, catalyst temperature and space volume, inter alia. Typical injection strategies compute the HC quantity q1 to be injected as the product of a first function f1 (where f1 is a function itself of space velocity (SV), engine speed (RPM) and fuel quantity (fuel)) and a second function, f2, which is a function of catalyst temperature, Tcat. More particularly, q1=f1(SV, RPM, fuel) *f2(Tcat). Thus, f1 and f2 are determined a priori to thereby compute q1. The signal representative of q1 is used as the control signal for an HC injector.

It should be noted that f2 is a function of the optimum catalyst conversion (i.e., NOx reduction) temperature. Such function f2 is shown in FIG. 1. It is noted that f2 has a value of 0 for catalyst temperatures less than T_LOW and catalyst temperatures greater than T_HIGH. The function f2 is 1.0 between catalyst temperature T1 and T2, where the optimum conversion temperature T_CAT_OPTIMUM for the particular catalyst shown in FIG. 1 is between T1 and T2. Finally it is noted that the function f2 monotonically increases from 0 to 1 between T_LOW and T1 and monotonically decreases from 1 to 0 between T2 and T_HIGH. Finally, it should be noted that the function f2 shown in FIG. 1 is for the particular catalyst when such catalyst is green, or un-aged. The inventor has recognized that this function, and more particularly T_CAT_OPTIMUM, changes as the catalyst ages. Thus, while the function f2 may be accurate for a green, or un-aged, catalyst, this a priori determined function f2 is not accurate as the catalyst ages. Thus, the amount of HC added to the reaction may not be optimum as the catalyst ages. Further, because there is no NOx sensor downstream of the catalyst the NOx reduction effectiveness is not measured directly. That is, there being no measure of the NOx reduction effectiveness there is no feedback signal which may be provided to modulate or adjust the hydrocarbon injection process.

The inventor has discovered a method and apparatus which enables the development of a feedback signal indicative of the effectiveness of a reactant in reducing a substance reacted with such reactant without use of a sensor to detect the amount of un-reacted substance.

SUMMARY OF INVENTION

In accordance with the present invention, a method and system are provided for controlling hydrocarbon injection into engine exhaust to reduce NOx. The method and system inject the hydrocarbon into the engine exhaust in accordance with detection of a light-off event. Typically light-off occurs once per key-on session. The light-off event can be detected because when there is a hydrocarbon-O2 reaction (i.e., the exotherm is generated by the reaction of HC with O2, not with NOx), such reaction is an exothermic reaction and thus heat is generated and given off. The generation of such heat may be detected by measuring the difference in temperature across the catalyst. The peak in NOx conversion efficiency temperature changes with age. However, because the peak in NOx conversion efficiency temperature occurs at substantially the same temperature as light off event, a determination of light-off by the system and method enables adjustment in the hydrocarbon injection level for maximum NOx reduction efficiency.

In another embodiment, a method is provided for controlling hydrocarbon injection into engine exhaust to react with and thereby reduce NOx in such engine exhaust. The reaction is facilitated by a catalyst. The catalyst has a temperature at which efficiency in facilitating such reaction is optimum, such efficiency changing with catalyst age. The method includes injecting the hydrocarbon into the engine exhaust in accordance with a signal representative of said temperature.

In one embodiment, a method is provided for controlling hydrocarbon injection into the engine exhaust to reduce NOx. The method includes injecting the hydrocarbon into the engine exhaust in accordance with detection of a light-off event.

In accordance with another feature of the invention, a system is provided for controlling hydrocarbon injection into an engine exhaust to reduce NOx in such exhaust, such engine exhaust with the NOx and the injected hydrocarbon being directed to a catalyst for reaction therein. The system includes a catalyst for facilitating a reaction between the injected hydrocarbon and $NO_x$ in the exhaust. A hydrocarbon injector is provided for injecting the hydrocarbon into the exhaust upstream of the catalyst. A detection system is included. The detection system includes a pair of detectors each detecting a common parameter in the exhaust, one of such sensors being upstream of the catalyst and the other one of the sensors being downstream of the first sensor. A processor is provided for controlling the hydrocarbon injector in response to the pair of sensors.

In one embodiment, the common parameter is temperature and wherein the detectors are temperature detectors.

In accordance with yet another embodiment of the invention, a processor is provided for controlling hydrocarbon injection into the engine exhaust to reduce NOx in such exhaust. The engine exhaust with the NOx and the injected hydrocarbon are directed to a catalyst to facilitate reaction between the injected hydrocarbon and the exhaust NOx. The processor is programmed to provide a control signal to a hydrocarbon injector to inject the hydrocarbon into the exhaust upstream in response to the output signal from a pair of sensors. Each of the pair of sensors is adapted detecting a common parameter in the exhaust, one of such sensors being upstream of the catalyst and the other one of the sensors being downstream of the first sensor.

In one embodiment the common parameter is temperature.

BRIEF DESCRIPTION OF DRAWINGS

Like reference symbols in the various drawings indicate like elements.

DETAILED DESCRIPTION

Figure 1:
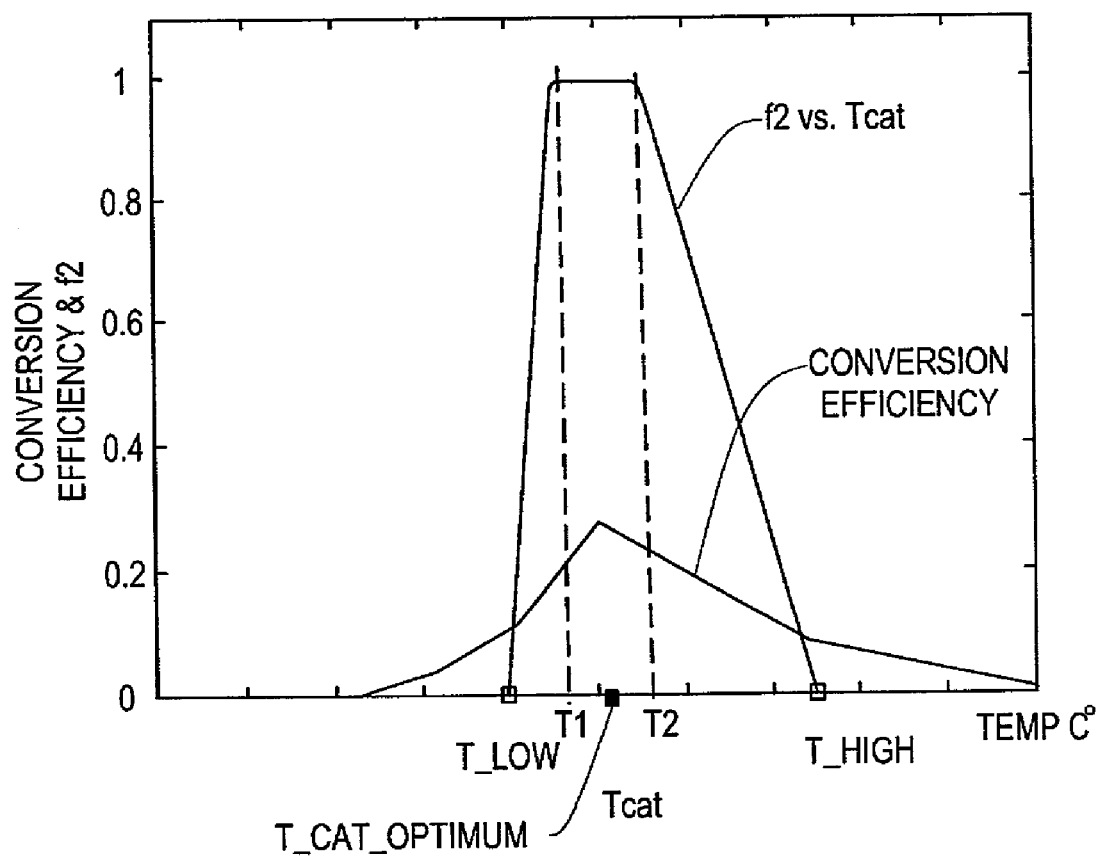
FIG. 1 is a graph showing the relationship between NOx conversion efficiency and the multiplier factor f2 as a function of temperature for a green catalyst.
Figure 2:
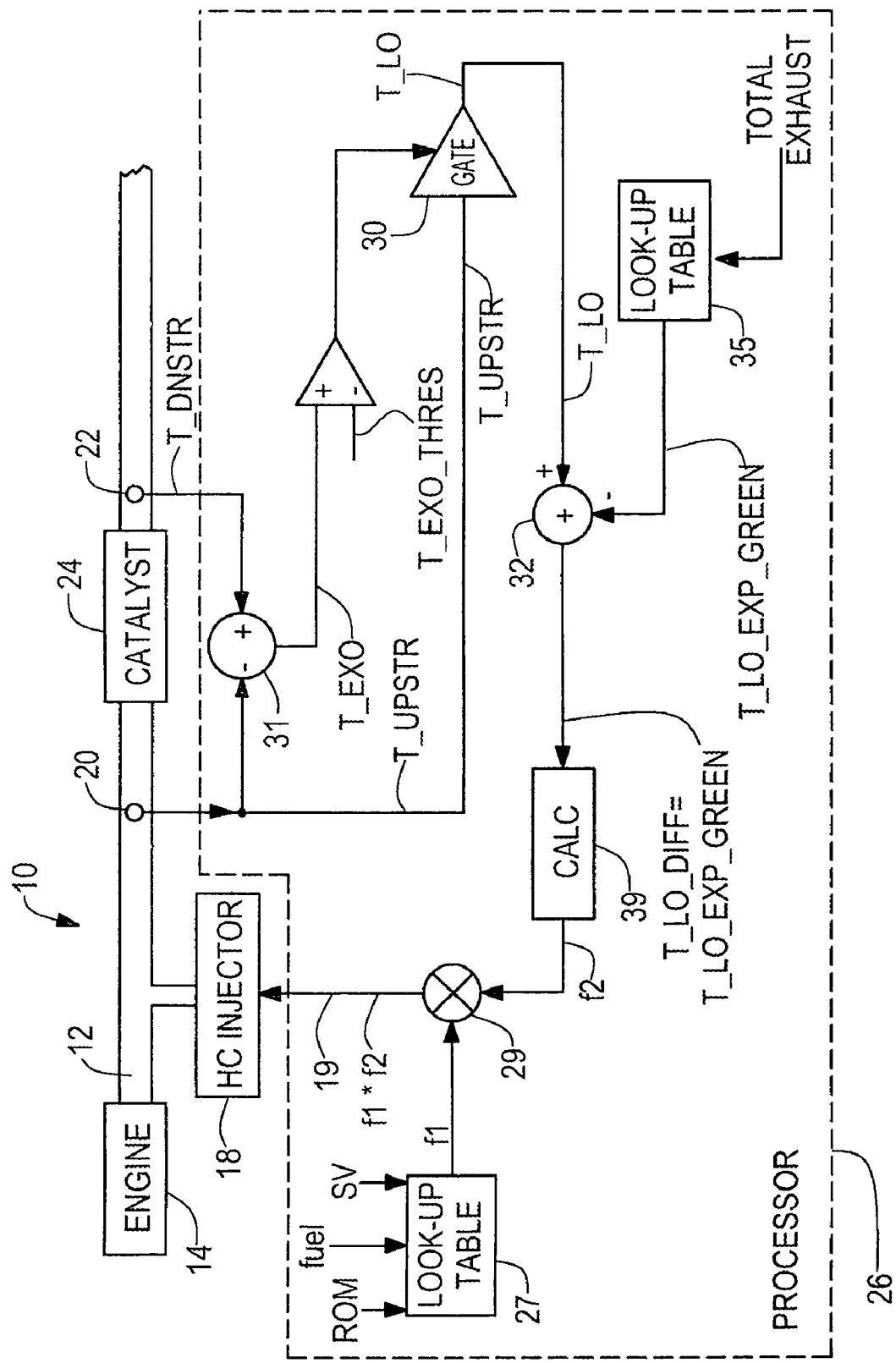
FIG. 2 is a functional block diagram of an engine exhaust system according to the invention.
Figure 3:
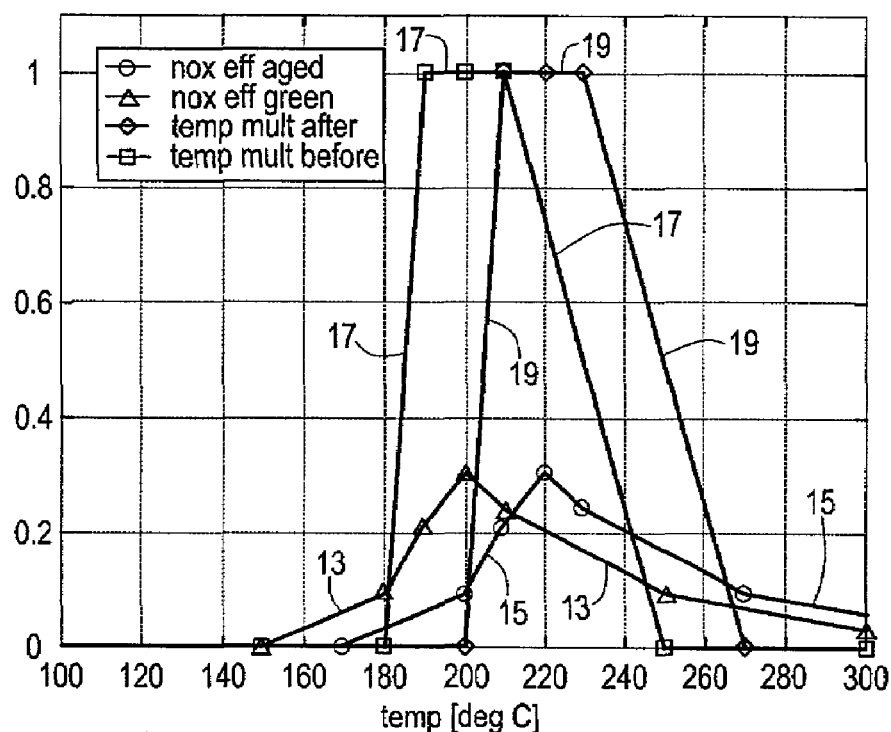
FIG. 3 is a graph showing the relationship between NOx conversion efficiency as a function of temperature for a green catalyst and for an aged catalyst, such FIG. also showing a function f2 used to control injection of a hydrocarbon into the NOx to react with and thereby reduce such NOx as a function of temperature for the green catalyst and for the aged catalyst.

Referring now to FIG. 2, a functional block diagram of an exhaust system 10 for reducing and controlling hydrocarbon (HC) injection into the exhaust 12 of an engine 14 via an HC injector 18 to reduce NOx in such exhaust is shown. The system 10 includes a catalyst 24 to facilitate the reaction between the HC and the NOx in the engine exhaust. More particularly, the system 10 includes the injector 18 for introducing hydrocarbons (HC) into the exhaust 18 in response to a control signal fed to the injector 18 on line 19 in a manner to be described in more detail hereinafter. Suffice it to say here that while the temperature T_CAT_OPTIMUM at which the hydrocarbon should react with the NOx in the exhaust for maximum NOx reduction efficiency may be established for a new or so-called green catalyst, as described above in connection with FIG. 1, the temperature T_CAT_OPTIMUM for optimum NOx reduction efficiency increases with catalyst age. This is illustrated in FIG. 3. Thus, it is noted that the temperature (i.e. T_CAT_OPTIMUM) at which there is optimum NOx reduction for a new catalyst is here, in this example, about 200 degrees Centigrade, as shown by curve 13, while for an aged catalyst the temperature (i.e. T_CAT_OPTIMUM) for optimum NOx conversion efficiency has increased to 220 degrees Centigrade or shifted by 20 degrees Centigrade, as shown by curve 15. Further, it is noted that at optimum conversion temperature, the proper amount of hydrocarbon to be injected may be determined a priori from such things as engine speed, engine load, EGR level, etc. However, this proper amount of hydrocarbon injection is reduced by a factor K, (where K is 1.0 between T1 and T2 and <1 for temperatures other than the optimum conversion temperature. More particularly, for the catalyst shown in FIG. 3, and referring also to FIG. 1, f2 in FIG. 2 has a value of 0 for catalyst temperatures less than T_LOW, here 180 degrees C. for a green catalyst and 200 degrees C. after the green catalyst has aged and catalyst temperatures greater than T_HIGH, here 250 for the green catalyst and 270 degrees C. after the green catalyst has aged. The function f2 in FIG. 3 is 1.0 between catalyst temperature T1 and T2, where the optimum conversion temperature T_CAT_OPTIMUM for the particular catalyst shown in FIG. 1 is between T1 and T2. Here, for the catalyst shown in FIG. 3, T1 is 180 degrees C. for the green catalyst and increases to 200 degrees C. after it has aged, T2 is 210 degrees C. for the green catalyst and increases to 230 degrees C. after it has aged. Thus, T_CAT_OPTIMUM for the green catalyst in FIG. 3 is here 200 degrees C. and shifts to 220 degrees C. after aging as shown in FIG. 3. As noted above in connection with FIG. 1, the function f2 monotonically increases from 0 to 1 between T_LOW and T1 and monotonically decreases from 1 to 0 between T2 and T_HIGH.

Thus, for optimum conversion, one needs to know the curve f2 as a function of catalyst temperature and, as noted above and from FIG. 3, the shift in f2 with the age of the catalyst 24. Here, the processor 24 determines the optimum conversion temperature of an aged catalyst and thus the processor is able to determine that proper function f2 for such aged catalyst. That is, if the factor f2 is tuned for a green catalyst, such factor f2 is sub-optimal for the aged catalyst. A knowledge of the optimal conversion temperature for the aged catalyst would however enable optimal selection of the factor f2.

Figure 4:
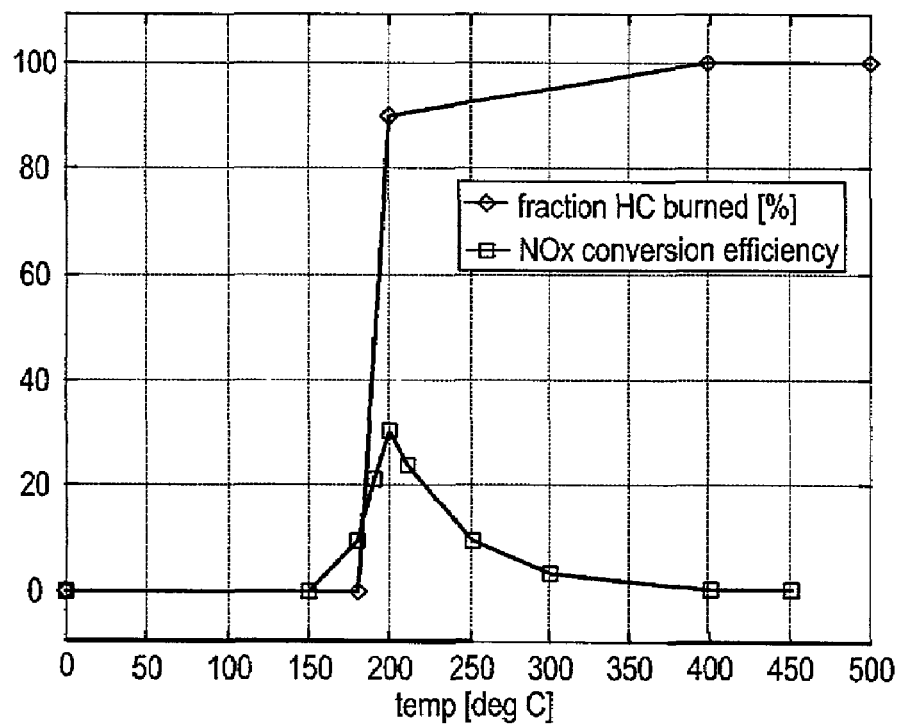
FIG. 4 is a graph showing the fractional portion of HC burned as a function of temperature and NOx conversion efficiency as a function of temperature.

Here, the processor 26 takes advantage of the property that from basic chemical kinetics the temperature for maximum NOx conversion coincides with the temperature of hydrocarbon light-off (i.e., the light-off temperature is the temperature when the hydrocarbons O2 reaction occurs). The light-off event can be detected because when there is this hydrocarbon-O2 reaction, such reaction is an exothermic reaction and thus heat is generated and given off. The generation of such heat may be detected by here measuring the difference in temperature across the catalyst. Reference is made to FIG. 4 which shows the fractional portion of HC burned as a function of temperature and NOx conversion efficiency as a function of temperature. Thus, it is noted from FIG. 4 that the peak in NOx conversion efficiency occurs at substantially the same temperature as when there is an exotherm or burning of the HC, here at about 200 degrees C. Thus, peak NOx conversion efficiency and HC light-off coincide at substantially the same temperature.

Thus, referring again to FIG. 2, a pair of temperature sensors 20, 22 is provided across the catalyst 24. The upstream and downstream temperature signals T_upstr and T_dnstr, respectively, are produced by the temperature sensors 20, 22, respectively. FIG. 2 is a functional block diagram of the processor 26, it being preferable that the processor 26 be a programmed digital processor to perform the functions shown in FIG. 2 and to be described below.

A look-up table 27 is provided to store the function f1 described above, such function f1 being a function of RPM, SV, start of injection (SOI), exhaust gas recirculation (EGR) and fuel.

The processor 26 produces the function f2 as a function of aging of the catalyst 24 conversion efficiency in a manner to be described and then multiplies the function f2 with the function f1 from table 27 in multiplier 29. It is first noted that the level of the hydrocarbon injected into the exhaust is checked to determine whether it is above a minimum level to insure that an exothermic reaction can be expected. If there is such a minimum level of HC, the processor computes the exotherm T_exo=T_dnstr−T_upstr in a subtractor 31 in response to the signals produced by the temperature sensors 22, 20, respectively. If the computed exotherm T_exo exceeds a threshold level T_exo_thres, the light-off temperature, T_lo, (i.e., the temperature produced by the upstr sensor 20 when the computed exotherm T_exo exceeds the threshold level T_exo_thres) is detected and such light-off signal T_lo is passed through a gate 30 to a subtractor 32. Gate 30 is an enabled gate to close temporarily when its enabling input exhibits a rising edge from negative to positive; otherwise it is open. This light-off temperature, T_lo which passes through gate 30 when such gate is temporarily closed, is compared with the light-off temperature expected for the catalyst 24 when such catalyst 24 was green; i.e., an expected light-off temperature T_lo_exp_green. This expected light-off temperature, T_lo_exp_green, is a function of total exhaust flow. Thus T_lo_exp_green (i.e., T_CAT_OPTIMUM) as a function of total exhaust flow is stored in a look-up table 35. The table 35 is fed the actual total exhaust flow by a sensor disposed in the engine intake air system. The output of the look-up table 35 is thus the light-off temperature expected for a green catalyst, i.e., T_lo_exp_green. This temperature T_lo_exp_green, along with the actual light-off temperature T_lo of the catalyst 24 (which was passed through gate 30) are fed to the subtractor 32. The subtractor 32 computes T_lo_diff=T_lo−T_lo_exp_green (i.e., the difference between the actual light-off temperature of catalyst 24 and the light-off temperature expected for a green catalyst). Thus, T_lo_diff is, as described above, a function of the aging of the catalyst 24 and particularly the effect of aging of the catalyst 24 on the optimum conversion temperature T_CAT_OPTIMUM (FIG. 1)

This difference T_lo_diff is used to compute f2 for multiplication with f1 produced by the look-up table 27 and thereby produce the correct control signal on line 19 for the HC injector 18. More particularly, the function f2 for a green catalyst must be shifted as described above in connection with FIG. 2 so that f2 produced by a calculator 39 is equal to f2 where f2 is the curve 17 of FIG. 3 shifted in temperature T_lo_diff, here 20 degrees C. to produce curve 19 in FIG. 3.

To put it another way, T_lo_diff=T_lo−T_lo_exp_green (i.e., where T_lo is the current light-off temperature of the catalyst 24 and T_lo_exp_green is the light-off temperature of the catalyst prior to its aging). The function multiplied by f1 in multiplier 29 is f2 for a green catalyst shifted in temperature by T_lo_diff. Thus, the calculator 39 produces f2 for multiplication with f1 in multiplier 29 which is a function of temperature in accordance with the curve 19 in FIG. 3 if, for example, T_lo_diff=20 degrees C.

The calculator 39 includes an integration to make T_lo_diff depend not only on the last recorded light-off (i.e., T_lo), but the average off the last few light-off events. Thus, the calculator computes the temperature for peak NOx conversion efficiency in accordance with T_lo(k)=T_lo(k+1)+ki*T_lo_diff, where ki is a calibration gain less than one. Thus, f2=f2 for a green catalyst shifted in temperature by T_lo_diff=T_lo(k+1)−T_lo_exp_green.

A number of embodiments of the invention have been described. For example, while the light-off event is detected in the above embodiment by detecting an exotherm across the catalyst by measuring a temperature difference with temperature sensors, a CO light-off condition may be detected using CO sensors across the catalyst.

Nevertheless, it will be understood that various modifications may be made without departing from the spirit and scope of the invention. Accordingly, other embodiments are within the scope of the following claims.

What is claimed is:

1. A method for controlling hydrocarbon injection into an engine exhaust to reduce NOx in such exhaust, such engine exhaust with the NOx and the injected hydrocarbon being directed to a catalyst for reaction therein, comprising:
   (a) identifying catalyst light-off by detecting production of an exothermic reaction across the catalyst when a temperature difference across the catalyst exceeds a threshold value;
   (b) determining a light-off temperature of the catalyst by measuring the temperature at which the exothermic reaction is detected; and
   (c) adjusting injection of the hydrocarbon into the reaction in accordance with the determined light-off temperature.

2. The method of claim 1 wherein said exothermic reaction is detected by a pair of sensors each detecting a common parameter in the exhaust, one of such sensors being upstream of the catalyst and the other one of the sensors being downstream of the first sensor.

3. The method of claim 2 wherein said hydrocarbon injection is based on the pair of sensors.

4. The method of claim 2 wherein said pair of sensors is a pair of temperature sensors.

5. A method for controlling hydrocarbon injection into an engine exhaust to reduce NOx in such exhaust, such engine exhaust with the NOx and the injected hydrocarbon being directed to a catalyst for reaction therein, comprising:
   (a) identifying catalyst light-off by detecting production of an exothermic reaction across the catalyst when a temperature difference across the catalyst exceeds a threshold value;
   (b) determining a light-off temperature of the catalyst by measuring the temperature at which the exothermic reaction is detected;
   (c) obtaining a measure of catalyst aging based on said detected temperature; and
   (d) adjusting injection of the hydrocarbon into the reaction in accordance with the measure of catalyst aging.

6. The method of claim 5 wherein said exothermic reaction is detected by a pair of sensors each detecting a common parameter in the exhaust, one of such sensors being upstream of the catalyst and the other one of the sensors being downstream of the first sensor.

7. The method of claim 6 wherein said hydrocarbon injection is based on the pair of sensors.

8. The method of claim 6 wherein said pair of sensors is a pair of temperature sensors.

* * * * *